Sept. 5, 1933.  T. LINDENBERG, JR  1,925,452
METHOD AND APPARATUS FOR RECORDING AND
REPRODUCING SOUND ON PHOTOGRAPHIC FILM
Original Filed July 15, 1931  2 Sheets-Sheet 1
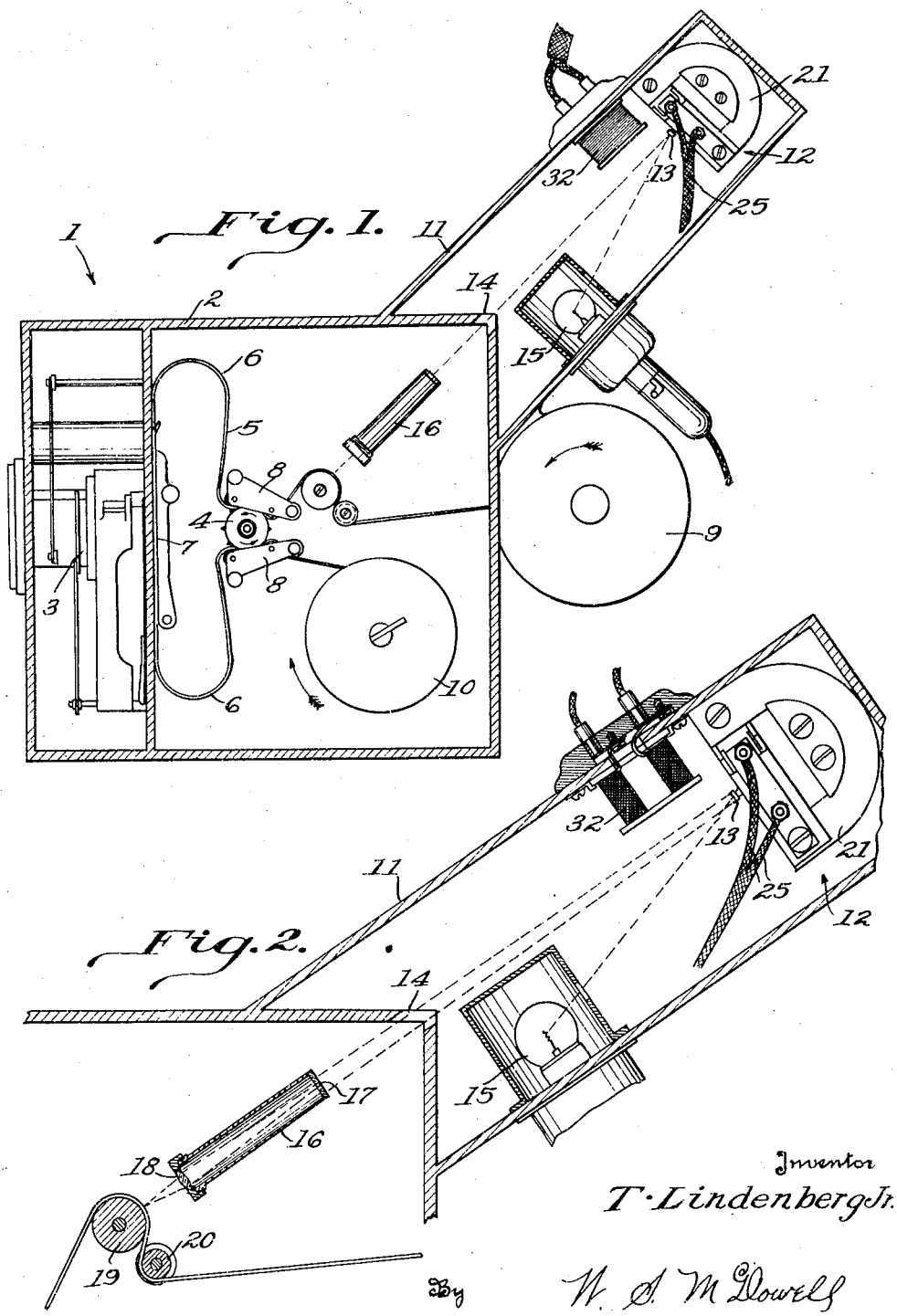
Inventor
T. Lindenberg Jr.
By W. A. McDowell
Attorney Sept. 5, 1933.  T. LINDENBERG, JR  1,925,452
METHOD AND APPARATUS FOR RECORDING AND
REPRODUCING SOUND ON PHOTOGRAPHIC FILM
Original Filed July 15, 1931  2 Sheets-Sheet 2
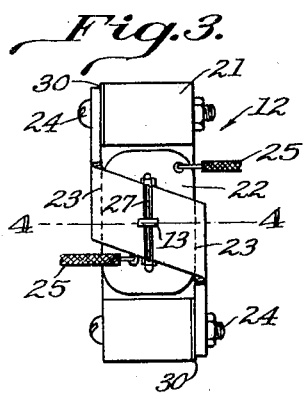
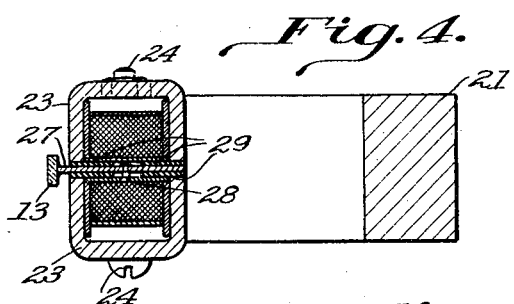
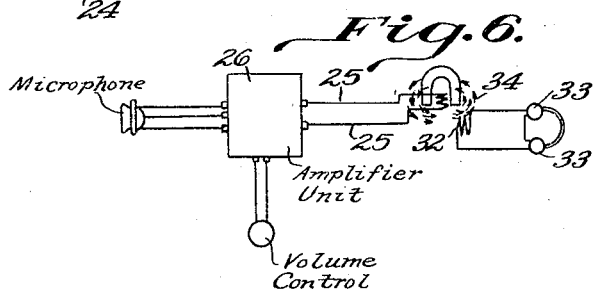
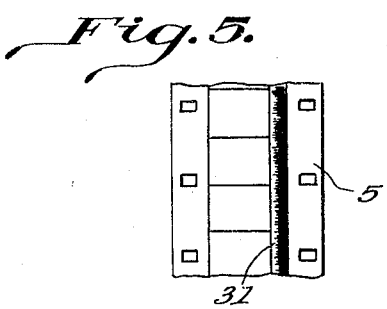
Inventor
T. Lindenberg Jr.
By W. A. McDowell
Attorney Patented Sept. 5, 1933

1,925,452

UNITED STATES PATENT OFFICE 1,925,452

METHOD AND APPARATUS FOR RECORDING AND REPRODUCING SOUND ON PHOTOGRAPHIC FILM

Theodore Lindenberg, Jr., Columbus, Ohio

Original application July 15, 1931, Serial No. 550,893. Divided and this application July 13, 1932. Serial No. 622,214

8 Claims. (Cl. 179—100.3)

This application is a division of my parent and copending application bearing Serial Number 550,893 and filed July 15, 1931. In that parent application, I have described and claimed a method and apparatus for recording and reproducing sound on photographic film, particularly useful in connection with the production of motion picture films wherein the sound is recorded on the film simultaneously with the recording of pictorial images thereon. Apparatus comprising a hand-carried type of camera capable of photographing motion pictures as well as recording sound therewith by the "variable area" method is described in detail in said parent application, and includes a novel arrangement and combination of parts whereby a single film is moved by a sprocket past a light condensing lens for recording sound thereon, and also past a photographic shutter for recording pictorial images on the same film.

The combination of sound and picture recording mechanism is claimed in said parent application, while this divisional application is directed to various novel features of the sound recording mechanism per se including control and regulation thereof, all limited to the recording or photographing of sound on film, preferably in conjunction with a hand-carried type of pictorial photographic camera. In other words, the present invention comprehends an apparatus for recording sound on photographic film involving the variable area method of recording sound employing a light valve, a rockable mirror, a mounting for the mirror comprising a magnetic unit formed to include a vibratory armature to which the mirror is attached for movement, and compressible cushioning means for dampening the vibrations of the armature, the arrangement being such that the aforesaid parts are located in a housing exterior to the casing proper of a hand camera and cooperate to record sound on a film within the camera casing by means of a condensing lens mounted adjacent said film and wholly within said camera casing; the present invention further comprehends a novel apparatus for regulating the recording and photographing of sound on film including an electro-magnetic unit controlled by sound impulses, and a sound monitor induction circuit located within the magnetic field of the magnetic unit, and preferably for controllably recording sound on photographic film which involves the "variable area" method of recording sound employing an electromagnetic unit and vibrating mirror; all of which are hereinafter described and claimed.

For a better understanding of the invention, reference is made to the accompanying drawings showing an embodiment thereof, but it will be understood that these structures need not be slavishly followed, and that the breadth of the invention is set out in the accompanying claims.

Figure 1 is a vertical sectional view showing somewhat diagrammatically the interior of a motion picture camera having the sound recording mechanism of the present invention incorporated therein, Figure 2 is an enlarged vertical sectional view taken through the sound recording mechanism, Figure 3 is an end elevation of the mirror vibrating unit used in connection with the present invention, Figure 4 is a horizontal sectional view taken on the line 4—4 of Figure 3, Figure 5 is a detail view showing a portion of the film formed with a sound track exposure thereon formed in accordance with the present invention, Figure 6 is a view showing a wire diagram of the apparatus.

Referring more particularly to the drawings, the numeral 1 designates the apparatus in its entirety which, for purposes of illustration, has been shown as that of a small portable camera of the type used by amateur photographers in making motion pictures, although it will be understood that the invention is equally adaptable to the type of cameras used by professionals or others in the motion picture industry.

This apparatus includes a camera unit 1, which is of any suitable standard construction, and comprises the usual light-tight casing 2 having arranged in the forward portion thereof the lens and shutter mechanism 3 by which the film is exposed and caused to travel in an intermittent manner past the lens, as is well known in the art. Also positioned within the casing 2 is the usual driving sprocket 4 over which the film, designated by the numeral 5, is trained in the usual manner to provide the upper and lower loops 6 and for passage within the guide 7 arranged to the rear of the shutter mechanism 3. By the arrangement of the film 5 relative to the sprocket 4, the loops 6 of the film are constantly maintained and which permit of intermittent motion of the film through the guides 7 while being passed at a constant speed over and adjacent the sprocket 4. The film is further trained over rollers carried in frames 8 and its ends led to the reels or magazines 9 and 10, of which numeral 9 designates the magazine or reel carrying the unexposed part of the film and numeral 10 the exposed or what is known as the "take up" magazine or reel. The latter reel is operated in connection with the sprocket to wind the film after the same has been photographically exposed by the operation of the shutter mechanism 3.

So far the mechanism described is that of the usual construction found in cameras of this type, the sprocket 4 and the related mechanism being operated by a crank or other means (not shown) causing the film to unwind from the reel 9, passed at a constant speed over the sprocket and guiding rolls, intermittently moved by the shutter mechanism and finally wound upon the reel member 10.

The sound-recording mechanism comprises in this instance a housing 11 attached in any suitable manner to the casing 2 and has positioned therein a magnetic vibrator, designated generally by the numeral 12. This vibrator is formed to include a small mirror or light reflector 13 arranged in registration with an opening 14, formed in the wall between the casing and the housing 11. Arranged within the housing 11 is a light source usually in the form of an incandescent bulb 15 which is adapted to throw a beam of light upon the mirror or reflector which, in turn, reflects the beam in a line through the opening 14 and into the casing 2.

Within the casing there is positioned a stationary tubular member 16 having its longitudinal axis in alignment or registration with the opening 14 and provided with a very restricted aperture or slit 17 in its upper end wall and having a condensing lens 18 positioned in its lower portion. The light reflected from the mirror 13 passes through this slit and the condensing lens 18 and produces a narrow concentrated image of the slit on the film. The film at this point is trained around guide rollers 19 and 20, the former of which is arranged so that the beam of light strikes the film squarely or at right angles to the longitudinal axis of said roll, the film being trained over the roller 19 and under the roller 20 thereby causing the film to be guided in an even and taut manner over said rollers, preventing slippage or slack.

The vibrator unit 12 carrying the mirror, consists of a permanent magnet 21, between the ends of which is bridged an electro-magnet 22 and held in place therebetween by pole piece 23 attached to the magnet 21 by screws or other fastening devices 24. The electro-magnet 22 is connected by leads 25 to the outlet side of the amplifier unit 26. Arranged within the magnet 22 is an armature 27 pivoted as at 28 centrally thereof for rocking movement relative to the pole pieces. Attached to one end of this armature and located exterior the electro-magnet 22 is a small glass mirror 13, previously mentioned.

This armature, which has a natural period or resonance point of approximately 6000 cycles, is prevented from over-responding or producing excessive vibrations by the insertion of a compressible material such as rubber or the like 29 between the armature and the pole pieces of the magnet. These rubber pieces will permit of a certain degree of movement of the armature but will dampen or repress the inherent pitch thereof and thereby neutralize the over-responsive vibrations together with excluding such extraneous vibrations as may be caused by the handling of the apparatus. The rubber dampening will also maintain the vibrator unit in adjustment at all times without frequent readjustments thereof.

The rubber material or pieces 29, which are arranged on each side of the armature, are preferably cemented in place thereon, and only need to be positioned between the ends of the armature and the pole pieces 22 to give good results, but it has been found advisable to extend the rubber material over substantially the full area of the armature in order to prevent undue vibrating or whipping action to take place in the uncovered portions of the armature which are apt to produce an undesirable condition. The portions of the rubber 29 positioned between the ends of the armature and the pole pieces of the magnet, may be compressed more or less to give the desired vibratory effect of the armature by adjusting the pole pieces relative to the armature, which adjustment may be effected by the provision of shims 30 between the fastening ends of the pole pieces and the ends of the permanent magnet.

From the structure so far described, it will be apparent that as the armature with its attached mirror is rocked or is oscillated to microphonic controlled impulses, the light rays from the incandescent lamp 15 will be reflected by the mirror 13 in a line through the opening 14, the slit 17 and the condensing lens 18 and upon the film. The vibratory mirror is so positioned relative to the slit 17 that under normal conditions only one half of the length of said slit is exposed to the beam. However, due to these mirror vibrations the light beam is caused to take a lateral path lengthwise of the slit and also expose the other half of the slit by the movement of the beam within the slot, which exposed portion will be increased and decreased in length and the image thereof registered upon the film after the same has passed through the condensing lens 18. The width of the slit image condensed by the lens 18 is at all times constant, thus resulting in a sound track of varying width upon the moving film which has the appearance of a serrated exposure as illustrated at 31 in Figure 5. The length and width of the teeth of this serrated edge depends, of course, upon the original sound wave introduced into the unit. As the principle involved in producing generally this light or slit image upon the film is well known in the art, no claim is laid thereto other than in connection with the particular mechanism and the arrangement employed, the important feature being that such parts are so arranged as to produce a compact unit eliminating such extra mechanism as has been found necessary in apparatus of this type. By the arrangement and construction of the apparatus set forth, which is extremely simple, the same is rendered particularly adaptable to the small hand carried cameras used by amateurs although it will be understood that it may be used with equal facility in the larger type of apparatus employed by professionals. One advantage or feature involved in this construction is the production of a sound track upon the film before the photographic exposure thereof which in this instance is possible with the particular arrangement of the film and the location of the sound recording mechanism relative thereto which permits of the elimination of extra mechanism for the guiding and movement of the film.

Another important feature of the present invention is the positioning of a monitor or induction unit 32 in the magnet field of the vibrator 12, whereby the induction thereof may be employed to operate an induction circuit, which may be used to effect the actuation of earphones 33 to permit the operator of the camera unit to note the amplitude of the sound current and thereby control, at the will of the operator, the operation of the amplifier unit 26 for varying the strength of the electric sound impulses used in actuating the mirror, thus providing for manual regulation of the mirror or vibrator to produce sound images on the film of desired amplitude or area. The induction unit in this instance is a separate coil positioned within the housing 11 and arranged adjacent or in close proximity to the electro-magnet 22 so as to be within the magnetic field thereof as illustrated diagrammatically in Figure 6 of the drawings, the magnetic field being indicated by arrows and designated by the numeral 34. By the use of this induction unit it is possible for an operator to note instantly when any one of the parts, such as the amplifier or the magnetic unit, is not functioning properly and thereby enables the operator to correct any objectionable recording before its passage through the camera or apparatus.

The apparatus may be crank operated or provided with a suitably geared motor for the feeding of the film, obtaining its source of power from batteries carried in connection with the apparatus. The batteries may also supply the current for the light source 15 and the lamp may be of the ordinary type found and used in connection with the lighting system of motor vehicles or small renewable dry cells of the type used for flash lamps.

While the apparatus has been particularly designed to develop sound recording on sixteen millimeter film, yet it may be adapted to larger film with equal facility. Although there has been shown and described a certain particular arrangement of the various parts of the apparatus, nevertheless it will be understood that changes may be made therein from time to time without departing from the spirit and scope of the present invention as set forth in the appended claims.

It will thus be seen that I have provided a novel mechanism for recording sound on film and for controlling and regulating the recording thereof. When the sound track is recorded on pictorial photographic film, the sound recording may be done before or after the pictorial image is placed thereon, although it is preferable to photograph the sound track thereon before the picture images. It will be obvious that separate films for picture and sound, or a plurality may be used, so long as the hereindescribed monitor induction circuit is employed; the same rule applies to the novel features of the remainder of the light recording mechanism.

What is claimed is:

1. An apparatus for recording sound on photographic film involving the variable area method of recording sound employing an electro-magnetic unit and vibrating mirror, and a sound monitor induction circuit located within the magnetic field of said electro-magnetic unit.

2. An apparatus for recording sound on photographic film including an electro-magnetic unit controlled by sound impulses, and a sound monitor induction circuit located within the magnetic field of said magnetic unit.

3. A film sound recording mechanism comprising the combination of a light source, a movable photosensitized film, a mirror vibratile to sound and operable to throw an image from said light source onto said film, and monitor means actuated by magnetic means influencing vibration of the mirror.

4. In a sound recording apparatus for photographing sound waves on film, the combination of a light valve, a rockable mirror, a mounting for said mirror comprising an electro-magnetic unit formed to include a vibratory armature to which said mirror is attached for movement, compressible cushioning means for dampening the vibrations of said armature, and a sound monitor induction circuit located within the magnetic field of said electro-magnetic unit.

5. In an apparatus for recording sound on photographic film involving the variable area method of recording sound, the combination of a film, a light source, an electro-magnetic unit and vibrating mirror, and a sound monitor induction circuit located within the magnetic field of said magnetic unit.

6. In a device of the class described, the combination of a movable film, a light source, an electro-magnetic unit having a pivoted armature therein, a vibratile mirror attached to said armature, a condensing lens, and a sound monitor coil, said mirror being in the path of light rays emanating from said light source and operable by said armature to vibrationally reflect said rays through the condensing lens onto said film in accordance with telephonic sound waves to be recorded, the sound monitor coil being in the magnetic field of the electro-magnetic unit and operable to inductively transmit the amplitude of the light or sound waves recorded on the film for purposes of control thereof.

7. Photographic sound recording mechanism including a movable photosensitized film, a light valve, a magnet having an armature associated therewith, a vibratile mirror attached to said armature, a lens located between said mirror and said film, and a sound monitor induction circuit located in the flux of the said magnet and operable to determine the amplitude of light or sound waves thrown on the film through the lens by the mirror, and means for energizing the magnet by a telephonic current.

8. A photographic film sound recording apparatus comprising a casing having a sprocket mounted therein, a film in said casing movable by said sprocket, tubular member in said casing mounted adjacent to said film, said tubular member having a light slit and a condensing lens therein, a housing exterior to and carried by said casing and angularly disposed therewith, said housing communicating with said casing through a common opening, a light valve in said housing, and a vibratile mirror mounted in said housing incident to rays of said light valve and operable to reflect said rays through the common opening, the tubular member and onto said film.

THEODORE LINDENBERG, Jr.